May 5, 1953

J. A. WALLEN 2,637,513

AIRCRAFT TANK ARRANGEMENT

Filed Oct. 5, 1948

Jarvis A. Wallen
INVENTOR.

BY James M. Clark
ATTORNEY

Patented May 5, 1953

2,637,513

UNITED STATES PATENT OFFICE 2,637,513

AIRCRAFT TANK ARRANGEMENT

Jarvis A. Wallen, Seattle, Wash., assignor to Boeing Airplane Company, a corporation of Delaware Application October 5, 1948, Serial No. 52,816

14 Claims. (Cl. 244—135)

The present invention relates to containers or tanks for the storage of liquids and more particularly to improvements in filling and venting arrangements for tanks for aircraft and other vehicles.

In the construction, design and use of fuel tanks for aircraft a number of problems are presented, particularly in connection with the location of the tank filler neck with respect to the surrounding wing structure and the provision of adequate space when the tank is filled to provide for expansion to insure against loss of fuel during flight and its attendant fire hazard. The present invention eliminates a number of those problems with which aircraft engineers and designers have had considerable difficulty in the past. In the conventional construction and design of aircraft wing tanks, the maximum height of the liquid in the tank, and therefore the bottom of the expansion space, is usually established by the filler neck location. In such prior constructions the location of the filler neck in the wing structure was therefore frequently limited to a comparatively small area in the vicinity of the front spar. Inasmuch as the structure in this area is usually of more importance than the structure in other areas of the wing it is very undesirable to disturb or cut out parts of this structure to install the filler neck and the overflow pan surrounding the filler opening in the wing skin.

A further advantage accruing from greater freedom in the tank filler location is that it may be placed where accidental overflow of an inflammable liquid would not be hazardous. It is very desirable to provide adequate means to insure against such overflow of the fuel during the filling operation to prevent the fuel spilling over the upper surface of the wing in which the tank is housed, or even within the wing, and to prevent the further fire hazards which those overflow conditions present. The overflow pan necessary with the conventional filler is not only large enough to catch possible excess liquid and drain it off through a line to the lower wing surface, but must be large enough to allow easy access to the filler cap in order that even a mechanic wearing the heavy gloves necessary in the Arctic regions can have access to the cap. Among the disadvantages of this type overflow pan are the removal of structure to permit of its installation, its aerodynamic drag, and its susceptibility to icing. It is also desirable in such installations that the opening for the tank vent be disposed at the wing undersurface. Prior designs and installations have endeavored to accomplish these desired arrangements and features, but such efforts have met with varying degrees of success and have not been completely satisfactory.

The present invention is accordingly directed to an improved tank filling and venting arrangement which is particularly adapted to aircraft wing tanks for the storage of liquids, which arrangement accomplishes automatically the provision of adequate expansion space as well as an undersurface vent line opening. It is also directed to such arrangements which minimize the possible overflow of the liquid over the top of the wing due to expansion of the liquid. The presently improved arrangement, as applied to an aircraft wing tank, includes a filling opening extending upwardly to the upper wing surface well aft of the front spar where it terminates in a removable cap which cooperates with a spring-biased valve in closing the main vent when the cap is removed and the tank is being filled. Contiguous to the filler opening there is preferably provided a pocket having upper and lower chambers between which communication is controlled by the above-mentioned valve which automatically interrupts the main vent and overflow line opening to the atmosphere through the lower surface of the wing. An auxiliary vent line is installed at a point through the top of the tank which determines the amount of expansion space open to the main vent. The improved arrangement is particularly adapted for fuel tanks within aircraft wings which are disposed at an angle of attack during their filling operations while on the ground and accomplishes all of the above desired results in a foolproof and efficient manner with a minimum of moving parts or piping.

It is accordingly a major object of the present invention to provide an improved filling and venting arrangement for aircraft and other vehicle tanks. A further object of this invention is the provision of a filling means which can be placed in a greater variety of locations within a wing or other body without involving removal of critical or necessary structure. A further object resides in an improved filling and venting arrangement which automatically provides space for the expansion of the liquid and insures that the tank cannot be filled beyond a predetermined level.

It is a further object of this invention to provide means whereby the possibility of the fluid overflowing out over the top of the wing, is reduced to a minimum and to further provide an arrangement where any overflow to the overflow line will be apparent and visible to the operator filling the tank. It is accordingly a corollary object of this invention to eliminate the need for an overflow pan and to replace the same with a flush cap. It is a still further objective to provide an improved combined tank filling and venting assembly as well as to provide such an improved arrangement which permits the vent line opening to be extended through the lower wing surface.

Other objects and advantages of the present invention will become apparent to those skilled in the art after reading the present description taken together with the accompanying drawings forming a part hereof, in which.

Figure 1:
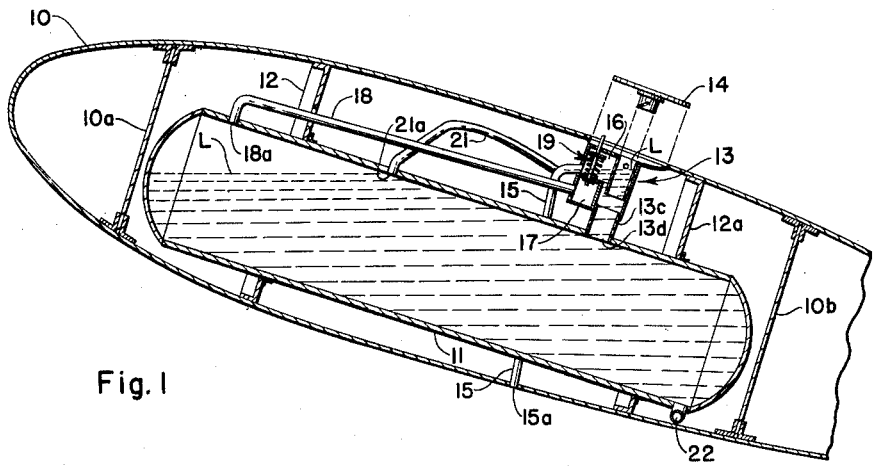
Fig. 1 is a cross-sectional view of an aircraft wing within which is housed a tank and a preferred form of the present improved venting and filling arrangement.

Referring now to Fig. 1, the numeral 10 represents an aircraft wing disposed at an angle of attack while the aircraft is at rest upon the ground, and is such as would be found in an aircraft having a conventional landing gear of two main forward wheels and a tail wheel unit. The present invention is not, however, limited to aircraft of this type and in those installations wherein the wings are substantially horizontal when the aircraft is at rest upon the ground the tanks may be installed at an angle, or the upper portions of the tank may be modified in accordance with the arrangements which are about to be described. The wing 10 is provided with internal structure such as the leading edge spar 10a, as well as a trailing spar 10b, between which is disposed a storage tank or container 11 to be utilized for the storage of fuel or other liquids. The tank 11 may be of any suitable construction and is preferably supported upon the structural framework 12 and 12a by which its weight and that of its contents are distributed to the wing structure.

The improved combined filler and vent connection is represented by the numeral 13, having a cap 14 and a connected main vent and overflow 15, and will be described in greater detail in connection with Figs. 2 and 3 wherein it is shown in greater detail. This combined filler and vent fitting 13 is provided with the removable flanged cap element 14 which cooperates with a valve assembly 19 controlling the opening between the chambers or compartments 16 and 17. A main vent line 18 extends from the region of the highest forward portion of the tank at an opening 18a, to the lower compartment 17; and an auxiliary vent line 21 extends from an opening 21a in the upper surface of the tank to the base portion 13c of the filler connection, the location of the opening 21a determining the level L to which the tank may be filled, and thereby also determining the amount of expansion space which is automatically provided. The overflow continuation of the main vent is represented by the aforementioned conduit 15 which during the filling operation, comprises an overflow means and extends from the upper compartment 16 down to the opening 15a at the lower surface of the wing 10. The base portion 13c of the filler and vent fitting 13 is attached to the upper portion of the tank 11 at its inlet opening 13d through which it is filled and the lowest portion of the tank is provided with a suitable outlet or drain 22 which is suitably connected to a pump and the remainder of the fuel system (not shown).

Figure 3:
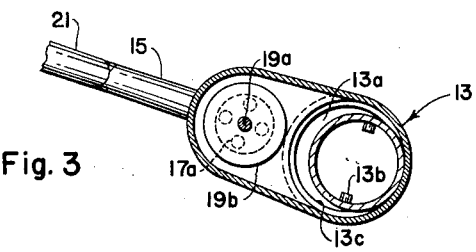
Fig. 3 is a cross-sectional view of the same as taken along the lines 3—3 of Fig. 2.
Figure 2:
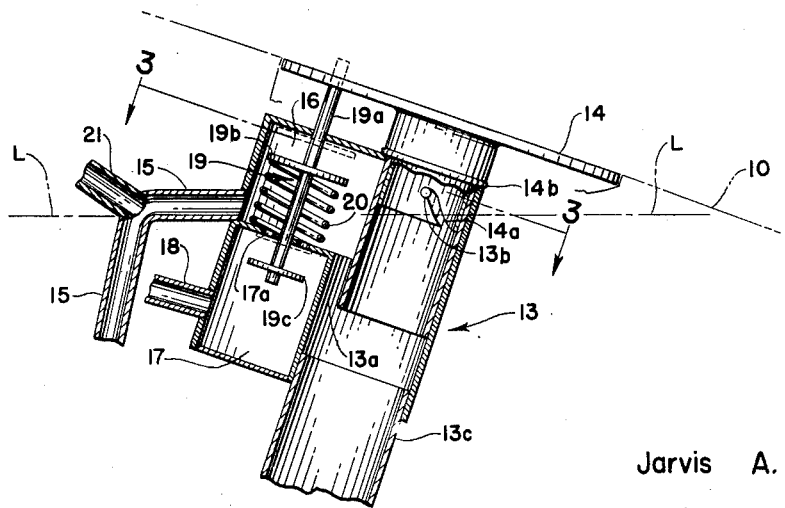
Fig. 2 is an enlarged sectional view of the improved filler and vent fitting shown in Fig. 1.

Referring now to Figs. 2 and 3, it will be noted that the filler and vent assembly 13 is preferably formed from a number of cylindrical or tubular elements such that a combined fitting of rounded cross-section is provided with the base portion 13c, attached to the opening 13d at the top of the tank 11, with adjacent upper and lower compartments 16 and 17, respectively. These compartments are separated by an apertured or perforated disc or plate forming a valve seat at 17a, and the upper compartment 16 is at all times open to the base portion 13c through the lunar or crescent-shaped passageway 13a between the upper and lower sections of the filler neck. The overflow-vent continuation 15 is connected to and in communication with the upper chamber 16, and the main vent 18 is similarly connected to and in communication with lower chamber 17. The auxiliary vent 21 is similarly connected to the tank 11 at the opening 21a and in communication with the overflow-vent line 15 adjacent the upper chamber 16 of the filler and vent fitting 13. The ends of the auxiliary vent 21 terminate substantially at the maximum filling level L and the intermediate portion is bent or bowed upwardly above the level L.

The flanged cap element 14 is provided with a pair of opposed disposed spiral slots 14a which engage the pins 13b carried by the filler neck of the fitting 13. The cap element 14 is also provided with an external bead or protuberance 14b which serves to cooperate with the pins 13b and the slots 14a in defining the downward movement of the cap 14 into the fitting 13 in retaining the same securely therein. A gasket or sealing means may be provided between the upper face of the fitting 13 and the lower edge of the bead 14b in order to prevent leakage or evaporation of the contents of the tank through to the upper wing surface.

The valve assembly 19 consists essentially of a central rod or stem 19a which is guided by an aligned opening within the valve seat 17a between the compartment 16 and 17 and by a similar opening in the upper end of the fitting 13. The rod 19a has fixedly attached to it the abutments or washers 19b or 19c, and a compression spring 20 is disposed between the valve seat 17a and the abutment 19b. The spring 20 tends to move the stem 19a upwardly and to bring the valve disc or lower abutment 19c into contact with the valve seat 17a which serves to close or interrupt any flow between the compartments 16 and 17. The rod 19a extends upwardly a sufficient distance, as indicated by the dotted lines in Fig. 2, to project above the position occupied by the flange of the cap element 14 in its attached position, such that when the cap element 14 is removed, the stem 19a permits the valve opening 17a to be closed as indicated by the dotted position of the abutment 19c.

When the cap element is, however, applied to the fitting 13, its flange engages the upper end of the rod 19a and depresses the valve assembly 19 into the position shown in full lines in Fig. 2, wherein communication is again restored between the upper and lower chambers 16 and 17 and their attached vent conduits 15 and 18, respectively. The valve 19 is accordingly automatically operated by the removal and replacement of the flanged cap element 15 such that as the cap element is removed, communication between the conduits 15 and 18 is interrupted, and when the cap element is placed in position such communication between these conduits is again restored. It will be noted, however, that at all times the base portion 13c in the filler fitting 13 is open to and in communication with the conduit 15 through the opening 13a and the upper chamber 16.

The operation of the improved filling and venting system is as follows: Assuming the wing 10 and the enclosed tank 11 to be in the attitude shown in Fig. 1, the cap element 14 is removed (permitting the valve assembly 19 to block or interrupt communication between the compartments 16 and 17) and the filler hose nozzle is inserted into the main filler neck of the fitting 13. As the fuel or other liquid gradually fills the tank 11, the air which is displaced from the interior of the tank is initially forced upwardly through the opening 13d in the top of the tank and upwardly through the base portion 13c where the major portion of it passes upwardly alongside the filler hose and a smaller portion of the displaced air may find its outlet upwardly through the opening 13a, the compartment 16 and outwardly through the overflow vent 15 and its outlet 15a.

As the filling of the tank continues and the top of the fluid reaches the main filler opening 13d at the top of the tank, the level of the fluid starts to climb upwardly within the filler neck portion 13c and also along the upper forwardly inclined portion of the tank. When the level of the liquid reaches and closes the filling opening at 13d, however, the air displaced from the interior of the tank can no longer escape through the filler neck 13c but all of the displaced air is then forced upwardly and outwardly through the outlet 21a, through the auxiliary vent line 21 and into the overflow-vent line 15. As this escaping displaced air reaches the line 15, it may pass in either or both directions namely, upwardly into the upper chamber 16 from whence it may pass through the opening 13a and then to the open air through the top of the filler fitting 13 alongside the filling nozzle. Or on the other hand, this escaping displaced air may pass downwardly through the overflow-vent line 15 and outwardly to the atmosphere through the lower surface opening 15a.

As the filling operation continues further, the surface of the liquid reaches the maximum level indicated by the line L, which level is clearly visible to the operator who is filling the tank, and when the liquid reaches this level he would normally shut off the nozzle valve on his filling hose and replace the filler cap 14 upon the fittings 13. Prior to his replacement of the cap 14, however, it will be noted that the valve 19 has remained closed and the main vent 18 up to this point has been blocked or made ineffective in assisting in the escape of the displaced air from the interior of the tank. In the event the operator inadvertently continued the filling of the tank slightly beyond the maximum level L the additional fluid would pass upwardly through the opening 13a, through the upper compartment or chamber 16 and outwardly and downwardly through the overflow-vent line 15, thence outwardly through the lower surface opening 15a where it would spill upon the ground free from the interior of the wing.

Under these conditions, the fluid in the forward portion of the tank would not have an opportunity to climb very far upwardly into the auxiliary vent 21, and the level L in the forward portion of the tank, once the auxiliary vent opening 21a is covered by the fluid, could not rise much higher due to the air which is trapped in the upper, forward portion of the tank being slightly compressed by the rising fluid. This air is, of course, trapped and prevented from escape due to the closing of the main vent 18 while the cap 14 is removed and the valve 19 is closed, and also by the fact that the heretofore operative auxiliary vent 21 has now also become ineffective due to the covering of its outlet 21a by the rising fluid. It therefore becomes impossible with the disclosed arrangement for the operator to fill the tank beyond the predetermined level and should he inadvertently continue in an effort to further fill the tank, the level L within the filler fitting 13 will rise to thhe point where it will overflow out through the line 15. In addition all of this overflowing fluid will be caused to fall clear of the airplane and will not accumulate within the interior to create a fire hazard.

When the filler cap 14 is replaced upon the filler fitting 13 and the valve 19 is automatically opened, the slight compression of the entrapped air in the upper, forward portion of the tank will be permitted to expand upwardly through the main vent 18 and the valve seat 17a to the upper chamber 16 and thence outwardly to the atmosphere through the line 15. This will permit of a relatively slight rise in the level L and the interior of the filler neck will preferably be provided with a mark or other indicia at which the filling should be stopped to allow for the slight expansion and to prevent any overflow or waste of fuel or other liquids. When the airplane has taken off and the wing 10 again assumes a normal flight attitude bringing the tank into a substantially horizontal position, the level L will become substantially parallel to the top of the tank and the level L within the filler neck will have dropped below the top of the tank. In this horizontal condition, the upper portion of the tank will be vented through the filler opening 13d, the auxiliary vent opening 21a and the main vent opening 18a. The venting through the filller opening 13d will occur through the passageway 13a, the upper chamber 16 and the overflow-vent 15 which latter line will also serve to vent the main and auxiliary vents 18 and 21, all to the lower surface of the wing.

Other forms and modifications of the present filling and venting arrangements, both with respect to their general organization and the details of their respective parts, which may occur to those skilled in the art after reading the foregoing description, are intended to come within the scope and spirit of this invention as more particularly defined in the appended claims.

I claim:

1. In a storage tank arrangement including a tank having a filling opening in the upper side thereof, a filler fitting connected with said filler opening for the filling of said tank, a main overflow line connecting said filler fitting to the atmosphere below said tank, an auxiliary vent line interconnecting an opening in the upper surface of said tank with said main overflow line, a main vent line connected between a further opening in the upper surface of said tank and said filler fitting, and automatic means associated with said filler fitting for closing off said main vent line when said filler fitting is uncovered for the filling operation of said tank.

2. In an aircraft tank installation, a tank enclosed at its upper portion by a top wall disposed in an inclined position when being filled upon the ground, said tank having a plurality of openings through the top wall thereof diposed at different levels in said inclined position when being filled, a filler fitting connected with the lowermost of said top wall openings, an auxiliary vent line connecting a higher of said top wall openings with the atmosphere, a main vent line connecting the uppermost of said top wall openings with said filler fitting, said filler fitting having a compartment open at all times to the said lowermost filling opening and to the atmosphere, and a further compartment in said filler fitting connected with said main vent line, an opening between the said compartments of said filler fitting, a filler cap releasably attachable to said filler fitting, and valve means for closing said communication opening between the said compartments of said filler fitting initiated by engagement of said filler cap with said valve means, said valve means being automatically closed upon removal of said filler cap for said filling operation during which time said main vent line is closed off by said valve means and is made ineffective for venting purposes, and said liquid level is automatically prevented from rising within said tank during the filling operation beyond the predetermined level of said auxiliary vent opening.

3. In an aircraft installation, a tank having an enclosing top wall disposed in an inclined position when being filled upon the ground, said tank having a plurality of openings through the top wall thereof disposed at different levels in said inclined position when being filled, a filler fitting connected with the lowermost of said top wall openings, an auxiliary vent line connecting an intermediate of said top wall openings with the atmosphere, a main vent line connecting the uppermost of said top wall openings with said filler fitting, said filler fitting having a compartment open at all times to the said filling opening and vented at all times to the atmosphere and a further compartment in said filler fitting connecting with said main vent line, said intermediate top wall opening for said auxiliary vent line being disposed at a predetermined distance below the extreme top of said tank for establishing a predetermined volume of air above the highest level to which said tank is filled when in its inclined position, an opening between the said compartments of said filler fitting, a filler cap releasably fastened to said filler fitting, and valve means for controlling said opening between the said compartments of said filler fitting initiated by engagement of said filler cap therewith, said valve means being automatically closed upon removal of said filler cap for said filling operation during which time said main vent line is closed off by said automatic valve means and made ineffective for venting purposes and said liquid level is automatically prevented from rising within said tank during the filling operation beyond the level of said intermediate auxiliary vent opening, the inclined disposition of said tank during said filling operation being such that as said level is prevented from rising within said tank and a predetermined volume of air is trapped in the upper portion thereof the fluid level within said filler fitting is visible to an operator prior to overflowing into said line by which the said fitting is vented to the atmosphere.

4. A filler and vent system for an aircraft tank having an enclosing top wall disposed in an inclined position when being filled upon the ground, said tank including a filler neck connected with an opening in the top wall of said tank, a main compartment connected with said filler neck, an overflow line connecting said main compartment with the atmosphere, a closable compartment within said filler fitting connected with a main vent opening in the top wall of said tank, an auxiliary vent opening in the top wall of said tank at an elevation intermediate to that of said filler opening and to the elevation of said main vent opening, an auxiliary vent line interconnecting said auxiliary vent opening and said overflow line forming an upwardly bowed air trap to prevent fluid overflow outwardly through said auxiliary vent opening and said interconnected overflow line, a filler cap detachably associated with said filler neck and valve means engageably by said filler cap to automatically open said closable compartment and provide communication between said main vent line, said main compartment and the atmosphere after filling has taken place and said filler cap has been replaced upon said filler neck.

5. In an aircraft tank arrangement including a tank enclosed at its top by an upper surface, said upper surface normally disposed so as to be inclined to the horizontal when in its position for the filling of said tank, a filler opening in the top of said tank extending through said upper surface thereof, a filler fitting connected with said filler opening for the filling of said tank in said inclined position, a main overflow line extending from said filler fitting to the atmosphere, an auxiliary vent line connected with an opening in the said upper surface of said tank and with the atmosphere, a main vent line connecting a further opening in the upper surface of said tank with said filler fitting, and automatic means associated with said filler fitting for closing off said main vent line when said filler fitting is uncovered for the filling operation of said tank.

6. In an aircraft tank arrangement, a tank enclosed at its top portion by an upper surface, said upper surface normally disposed so as to be inclined to the horizontal when in its position for filling while the aircraft is at rest upon the ground, said tank having a plurality of openings through said upper surface at different elevations when said tank is disposed in its inclined filling position, a filler fitting connected with the lowermost of said openings, an auxiliary vent connecting a higher of said openings with the atmosphere, said auxiliary vent connection establishing a predetermined level to which said inclined tank is filled, a main vent line connecting the highest of said openings with said filler fitting, and means associated with said filler fitting for automatically making said main vent ineffective during the filling operation to prevent the filling of said tank above said predetermined level as established by said auxiliary vent connection.

7. In aircraft, a fuel tank having its upper portion enclosed by an upper surface, said upper surface normally disposed so as to be inclined to the horizontal when said tank is in its filling position while the aircraft is at rest upon the ground, said tank provided with a plurality of openings spaced at different elevations through its said upper surface in said filling position, a filler fitting connected with the lowermost of said openings, an auxiliary vent line connecting a higher of said openings with the atmosphere at a point below the bottom of said tank, a main vent line connecting the highest of said openings with a closable compartment within said filler fitting, means connecting said auxiliary vent line with said filler fitting said auxiliary vent line establishing the level to which said inclined tank is filled and above which a predetermined air space is provided, a filler cap arranged to be releasably attached to said filler fitting, and means movably carried by said filler fitting disengageable from said filler cap for the automatic closing of said closable compartment upon removal of said filler cap and the concurrent closing of said main vent line to insure provision of said predetermined air space within the upper portion of said tank during its filling operation.

8. In an aircraft tank arrangement, a tank enclosed at its top by a wall surface disposed in an inclined position during the filling of said tank, said tank provided with openings through its top wall surface at different elevations in said inclined filling position, a filler fitting connected with the lower of said openings, a vent line connecting a higher of said openings with the atmosphere at a point beneath said tank, said filler fitting having a mouth portion disposed at a higher elevation than said vent opening, means for closing said filler fitting mouth, said higher opening being disposed at a predetermined distance below the top of said tank in said inclined position arranged in such manner that as the rising fluid during filling covers said higher opening, as a result of said higher filler fitting mouth, said vent becomes ineffective as a vent and an air space of predetermined volume is automatically obtained within the top portion of said tank, and as said tank assumes a horizontal position during flight at which said tank is emptied said higher vent opening becomes uncovered by said fluid and is made effective as a vent for said tank.

9. In an aircraft wing tank installation, an aircraft wing disposed at an inclination to the horizontal while the aircraft is at rest upon the ground, a tank enclosed within said wing, said tank having an enclosing upper wall similarly inclined to the horizontal when in its filling position within the wing while the aircraft is upon the ground, a continuously open vent connection through the upper wall of said tank disposed at a predetermined distance beneath the extreme top portion of said tank for establishing a maximum filling line above which a predetermined volume of air is trapped, a filler connection extending through said tank upper surface at a point aft of and beneath the elevation of said vent connection in said inclined filling position whereby said tank may be filled through said filler connection to said predetermined level at which said continuously open vent connection is covered and becomes ineffective for venting said predetermined air space while said airplane is upon the ground, the said filler connection having a closable mouth portion disposed at a higher elevation than said vent connection permitting filling of said tank to said predetermined level before overflowing occurs through said filler connection mouth portion.

10. In an aircraft wing tank installation, an aircraft wing disposed at an inclination to the horizontal while the aircraft is at rest upon the ground, a tank enclosed within said wing, said tank having an enclosing upper wall similarly inclined to the horizontal when in its filling position within the wing while the aircraft is upon the ground, a continuously open vent connection through the upper wall of said tank disposed at a predetermined distance beneath the extreme top portion of said tank for establishing a maximum filling line above which a predetermined volume of air is trapped, a filler connection extending through said tank upper surface at a point aft of and beneath the elevation of said vent connection in said inclined filling position, the said filler connection having a closable mouth portion disposed at a higher elevation than said vent connection permitting filling of said tank to said predetermined level before overflowing occurs through said filler conection mouth portion whereby said tank may be filled through said filler connection to said predetermined level only at which said continuously open vent connection is covered with fluid and becomes ineffective for purposes of venting said predetermined air space while said airplane is upon the ground, the relative arrangement of said venting and filling connections through the upper surface of said tank being such that as said aircraft wing and tank assume their normal level flight attitude the said predetermined air space is distributed aft over the surface of the fluid in said tank to a position at which said vent connection becomes uncovered and is made effective for venting purposes.

11. An aircraft tank filling and venting system, as set forth in claim 10 characterized by the said vent connection extending from said opening in said tank upper surface at said predetermined level of filling to a common connection to the atmosphere at the undersurface of said enclosing wing and to said filler fitting whereby in the normal flight attitude of said tank both said filler and said vent connections are effective as vents for said tank.

12. An aircraft tank filling and venting system of the type set forth in claim 10 characterized by the said vent connection extending from said opening in said tank upper surface at said predetermined level of filling to a connection to the atmosphere at the lower surface of said enclosing wing, said vent connection having a portion intermediate its opening through the upper wall surface of said tank and the opening to the atmosphere at said wing lower surface disposed above the predetermined filling levels of said tank in both its inclined and flight attitudes in such manner that liquid cannot flow out through said vent connection during the filling operation while said airplane is disposed upon the ground.

13. In an aircraft tank arrangement including a tank enclosed at its top portion by an upper surface, said upper surface disposed so as to be inclined to the horizontal when said tank is in position for filling while the aircraft is at rest upon the ground, a filler opening in said upper surface, a filler fitting connected with said filler opening for the filling of said tank in said inclined position, a main overflow line connecting said filler fitting to the atmosphere at a point below said tank, an auxiliary vent line connecting a further opening through the upper surface of said tank with the atmosphere through said main overflow line, a main vent line connecting a further opening in the upper surface of said tank with said filler fitting separate from the connection between said filler fitting and said filler opening, and means including a spring-biased detent associated with said filler fitting for closing off said main vent line when said filler fitting is uncovered for the filling operation of said tank in said inclined position.

14. In a storage tank arrangement, a storage tank enclosed at its top by an upper surface, said upper surface normally disposed so as to be inclined to the horizontal when in its position for the filling of said tank, a filler opening and a continuously open vent opening disposed at spaced points in said tank upper surface, said filler opening disposed at a lower level than said vent opening in said filling position and said filler opening normally disposed at substantially the same level as said vent opening in the emptying position of said tank, a filler fitting connected with said filler opening, means for closing the filler end of said filler fitting, a continuously open overflow line connected with said filler fitting and opening to the atmosphere, and a continuously open vent line connected at one end with said vent opening in said tank upper surface and open at its other end to the atmosphere, said vent opening in said tank upper surface disposed at a lower level than the topmost portion of said tank in its inclined filling position arranged to automatically provide a predetermined air space volume within the top portion of said tank after the filling level has covered said vent opening in said tank upper surface and has thereby made said opening ineffective for venting the said predetermined air space within the top portion of said tank in said inclined filling position, both said vent and filler openings in said tank upper surface being effective as vents for the contents of said tank in the emptying position of said tank.

JARVIS A. WALLEN.

References Cited in the file of this patent

UNITED STATES PATENTS

| Number | Name | Date |
|---|---|---|
| 1,714,296 | Carlson | May 21, 1929 |
| 1,983,988 | Mougey et al. | Dec. 11, 1934 |
| 2,357,626 | Arnold | Sept. 5, 1944 |
| 2,373,118 | Johnson | Apr. 10, 1945 |
| 2,458,245 | Bordelon | Jan. 4, 1949 |

FOREIGN PATENTS

| Number | Country | Date |
|---|---|---|
| 538,129 | France | Mar. 14, 1922 |